US010565292B2

(12) United States Patent
Fernandez-Ruiz

(10) Patent No.: US 10,565,292 B2
(45) Date of Patent: Feb. 18, 2020

(54) METHOD AND SYSTEM FOR IDENTIFYING AND DELIVERING ENRICHED CONTENT

(71) Applicant: Yahoo Holdings, Inc., Sunnyvale, CA (US)

(72) Inventor: Bruno M. Fernandez-Ruiz, London (GB)

(73) Assignee: Oath Inc., New York, NY (US)

( * ) Notice: Subject to any disclaimer, the term of this patent is extended or adjusted under 35 U.S.C. 154(b) by 76 days.

(21) Appl. No.: 14/364,168

(22) PCT Filed: Jun. 14, 2013

(86) PCT No.: PCT/CN2013/000702
§ 371 (c)(1),
(2) Date: Jun. 10, 2014

(87) PCT Pub. No.: WO2014/198008
PCT Pub. Date: Dec. 18, 2014

(65) Prior Publication Data
US 2015/0205768 A1 Jul. 23, 2015

(51) Int. Cl.
*G06F 17/22* (2006.01)
*G06F 16/2457* (2019.01)
(Continued)

(52) U.S. Cl.
CPC .... *G06F 17/2247* (2013.01); *G06F 16/24578* (2019.01); *H04L 67/306* (2013.01); *H04L 67/42* (2013.01)

(58) Field of Classification Search
CPC .......................... H04L 67/306; G06F 17/30867
(Continued)

(56) References Cited

U.S. PATENT DOCUMENTS 6,804,659 B1 * 10/2004 Graham ................ G06Q 30/02
705/14.49
8,051,145 B2 11/2011 Wu
(Continued)

FOREIGN PATENT DOCUMENTS

| CN | 1477544 A | 2/2004 |
|---|---|---|
| CN | 101529454 A | 9/2009 |
| WO | 2013035121 A1 | 3/2013 |

OTHER PUBLICATIONS

Hoffman, Chris; "How to Access Mobile Websites Using your Desktop Browser"; Mar. 5, 2013; How-To Geek; <http://www.howtogeek.com/139136/how-to-access-mobile-websites-using-your-desktop-browser>.*

(Continued)

*Primary Examiner* — Stephen S Hong
*Assistant Examiner* — Broderick C Anderson
(74) *Attorney, Agent, or Firm* — Pillsbury Winthrop Shaw Pittman LLP

(57) ABSTRACT

Method, system, and programs for identifying and delivering content. In one example, a request for content is first received from a user, via the communication platform. One or more parameters are obtained which are associated with the platform on which the requested content is to be presented. When the requested page is retrieved, it is determined whether the page was created with respect to a second platform that is more restrictive than the first platform. If so, additional content is generated, the selection of which is based on the parameters associated with the platform on which the requested content is to be presented as well as the content of the requested content page. The additional content is integrated with the requested content page and then transmitted to the user as a response to the request.

25 Claims, 11 Drawing Sheets

(51) Int. Cl.
*H04L 29/08* (2006.01)
*H04L 29/06* (2006.01)

(58) Field of Classification Search
USPC .......................................................... 715/234
See application file for complete search history.

(56) References Cited

U.S. PATENT DOCUMENTS

| | | | |
|---|---|---|---|
| 8,229,915 | B1 | 7/2012 | Lloyd et al. |
| 8,239,755 | B2 | 8/2012 | Maguire |
| 8,868,570 | B1 | 10/2014 | Skut |
| 2002/0147645 | A1* | 10/2002 | Alao .................. G06Q 30/0209 705/14.54 |
| 2004/0260767 | A1* | 12/2004 | Kedem .................. G06Q 30/02 709/203 |
| 2006/0122889 | A1 | 6/2006 | Burdick |
| 2007/0296805 | A1 | 12/2007 | Tedenvall et al. |
| 2008/0091521 | A1* | 4/2008 | Ho ...................... G06F 17/3089 705/14.73 |
| 2008/0306815 | A1* | 12/2008 | Dykes .................. G06Q 30/02 705/14.73 |
| 2009/0138798 | A1 | 2/2009 | Fan |
| 2009/0187593 | A1 | 7/2009 | Chen et al. |
| 2009/0215478 | A1 | 8/2009 | Leinonen |
| 2010/0017704 | A1 | 1/2010 | Jaffe |
| 2010/0161378 | A1 | 6/2010 | Josifovski |
| 2010/0180192 | A1 | 7/2010 | Hall |
| 2010/0293598 | A1 | 11/2010 | Collart |
| 2011/0054960 | A1 | 3/2011 | Bhatia |
| 2012/0203861 | A1 | 8/2012 | Flack |
| 2012/0311140 | A1 | 12/2012 | Kuroda |
| 2013/0117110 | A1* | 5/2013 | Wu ........................ G06Q 30/02 705/14.54 |
| 2013/0133081 | A1 | 5/2013 | Pallakoff et al. |
| 2013/0326337 | A1 | 12/2013 | Lehmann et al. |
| 2013/0326406 | A1 | 12/2013 | Reiley et al. |
| 2014/0012676 | A1 | 1/2014 | Forte |
| 2014/0214535 | A1 | 7/2014 | Kee et al. |
| 2014/0351268 | A1 | 11/2014 | Weskamp |

OTHER PUBLICATIONS

"Ad Insertion in Automatically Composed Documents"; Bento; <http://www.jbento.info/papers/ads_pdm.pdf>; Published Sep. 7, 2012.*
International Preliminary Report on Patentability dated Dec. 15, 2015 in International Application No. PCT/CN2013/000702.
International Search Report dated Mar. 20, 2014 in International Application No. PCT/CN2013/000702.
Office Action dated Jan. 21, 2016 in U.S. Appl. No. 14/452,645.
Office Action dated Nov. 22, 2016 in U.S. Appl. No. 14/452,645.
Office Action dated Jul. 29, 2016 in U.S. Appl. No. 14/452,645.
Notice of Allowance dated Mar. 13, 2017 in U.S. Appl. No. 14/452,645.

* cited by examiner

METHOD AND SYSTEM FOR IDENTIFYING AND DELIVERING ENRICHED CONTENT

BACKGROUND

1. Technical Field

The present teaching relates to methods, systems and programming for Internet Service. More particularly, the present teaching relates to methods, systems, and programming for identifying and delivering content.

2. Discussion of Technical Background

With the quickly-growing adoption of smart phones and mobile tablet computers among consumers of the Internet, more and more consumers are accessing content on such mobile devices. Generally speaking, mobile devices, when compared to, for example, a desktop computer, tend to be more limited in certain aspects such as bandwidth and display size. Consequently, certain content, such as a web page intended to be viewed on a desktop computer, is not easily viewable or navigable on a mobile platform. To address this problem, many content providers have developed, for example, "mobile-specific" web sites which present the requested content in a way that is smaller in size and more easily readable and navigable by a user. The user seeking this content still uses the same URL but the site detects the platform and redirects to a platform-specific page. More recently, as more and more users are accessing content on mobile platforms, there are more and more content providers that are choosing to develop and maintain "mobile-specific" sites exclusively. However, when such mobile-specific content pages are viewed on a platform such as a desktop computer, the minimalist design for a mobile device does not provide a user with an experience that has come to be expected when accessing a content page on, for example, a desktop computer. In addition, with the larger browser display sizes that are typically associated with other devices such as desktop computers, there is an opportunity to include additional content that a user might find helpful when viewing the requested content page.

Hence, existing solutions to displaying mobile-specific content pages, do not address the issue of providing the same content to a user of a desktop computer in a way that is generally expected by users when accessing content pages. Therefore, there is a need to develop techniques to enrich mobile-specific content pages for display on a larger platform in order to provide the user with additional content and an experience that is superior to that which is available on a mobile-specific page.

SUMMARY

The present teaching relates to methods, systems and programming for Internet Service. More particularly, the present teaching relates to methods, systems, and programming for identifying and delivering content.

In one example, a method, implemented on a machine having at least one processor, storage, and a communication platform connected to a network for providing content, is disclosed. A request for content is first received from a user, via the communication platform. One or more parameters are obtained which are associated with the platform on which the requested content is to be presented. When the requested page is retrieved, it is determined whether the page was created with respect to a second platform that is more restrictive than the first platform. If so, additional content is generated, the selection of which is based on the parameters associated with the platform on which the requested content is to be presented as well as the content of the requested content page. The additional content is integrated with the requested content page and then transmitted to the user as a response to the request.

In another example, a method, implemented on a machine having at least one processor, storage, and a communication platform connected to a network for presenting content to a user, is disclosed. A request for content is initiated by a user and transmitted by the platform for which the requested content is to be presented. Parameters associated with the platform are also transmitted. When the requested page is retrieved, it is determined whether the requested content page is created for a platform that is more or less restrictive than the requesting platform. If the requested page is configured to be presented on a platform that is more restrictive than the requesting platform, additional content is retrieved. This additional content is selected based on its relationship to the requested content as well as parameters such as the profile of the requesting user. The additional content is integrated with the requested content to create an enriched content page which is presented to the user.

In yet another example, a method, implemented on a machine having at least one processor, storage, and a communication platform connected to a network for identifying and integrating additional content with requested content, is disclosed. A request for content is first received from a user. This request contains user account information, requested content information, and the requesting platform information. The requested content page is received and determined whether the requested content page was created for a platform that is more restrictive than the requesting platform. When it is determined that the requesting platform is less restrictive, additional content is identified and integrated with the requested content page to generate an enriched content page, which is transmitted to the requesting user.

In a further example, a method, implemented on a machine having at least one processor, storage, and a communication platform connected to a network for providing content, is disclosed. A request for content is first received from a user, via the communication platform. One or more parameters are obtained which are associated with the platform on which the requested content is to be presented. When the requested page is retrieved, it is parsed into a number of components such as text, images, and links. Additional content is retrieved, the selection of which is based on the parameters associated with the platform on which the requested content is to be presented as well as the content of the requested content page. The additional content is integrated with at least some of the components of the requested content page and then transmitted to the user as a response to the request.

In a different example, a system having at least one processor, storage, and a communication platform connected to a network for providing an enriched content page is disclosed. The system includes a request handling unit, a parameter handling unit, a content retrieving unit, a platform assessment unit, an enriched content generator, and a content pager generator. The request handling unit is configured for receiving and transmitting a request for content from a user. The parameter handing unit is configured for obtaining and transmitting one or more parameters associated with a first platform on which the requested content is to be presented. The content retrieving unit is configured for obtaining a page of the requested content. The platform assessment unit configured for determining whether the page is created with respect to a second platform that is more restrictive than the first platform. The enriched content generator is configured for generating, when the page is created with respect to the second platform, additional content determined based on the one or more parameters and/or the content page. The content page generator is configured for integrating the additional content with the content page to generate an enriched content page for the first platform and transmitting the enriched content page to the user as a response to the request.

Other concepts relate to software for implementing the generation of content. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for providing content, where when the information is read by the machine, causes the machine to perform a series of steps. A request for content is first received from a user, via the communication platform. One or more parameters are obtained which are associated with the platform on which the requested content is to be presented. When the requested page is retrieved, it is determined whether the page was created with respect to a second platform that is more restrictive than the first platform. If so, additional content is generated, the selection of which is based on the parameters associated with the platform on which the requested content is to be presented as well as the content of the requested content page. The additional content is integrated with the requested content page and then transmitted to the user as a response to the request.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to providing enriched content in response to a request for content, which can be any form of content such as a news article, movie review, blog entry, word processing document, or any other textual material accessible through a medium such as the Internet or a private network. However, based on certain aspects relating to the content, the user requesting the content, and the platform upon which the content is to be presented, certain additional content may be retrieved and integrated with the requested content to create an enriched content viewing experience for the requesting user. As discussed in more detail below, the additional content may be from any number of sources and is selected based on its relatedness to a number of factors to be most relevant to the user when viewing the requested content.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1A:
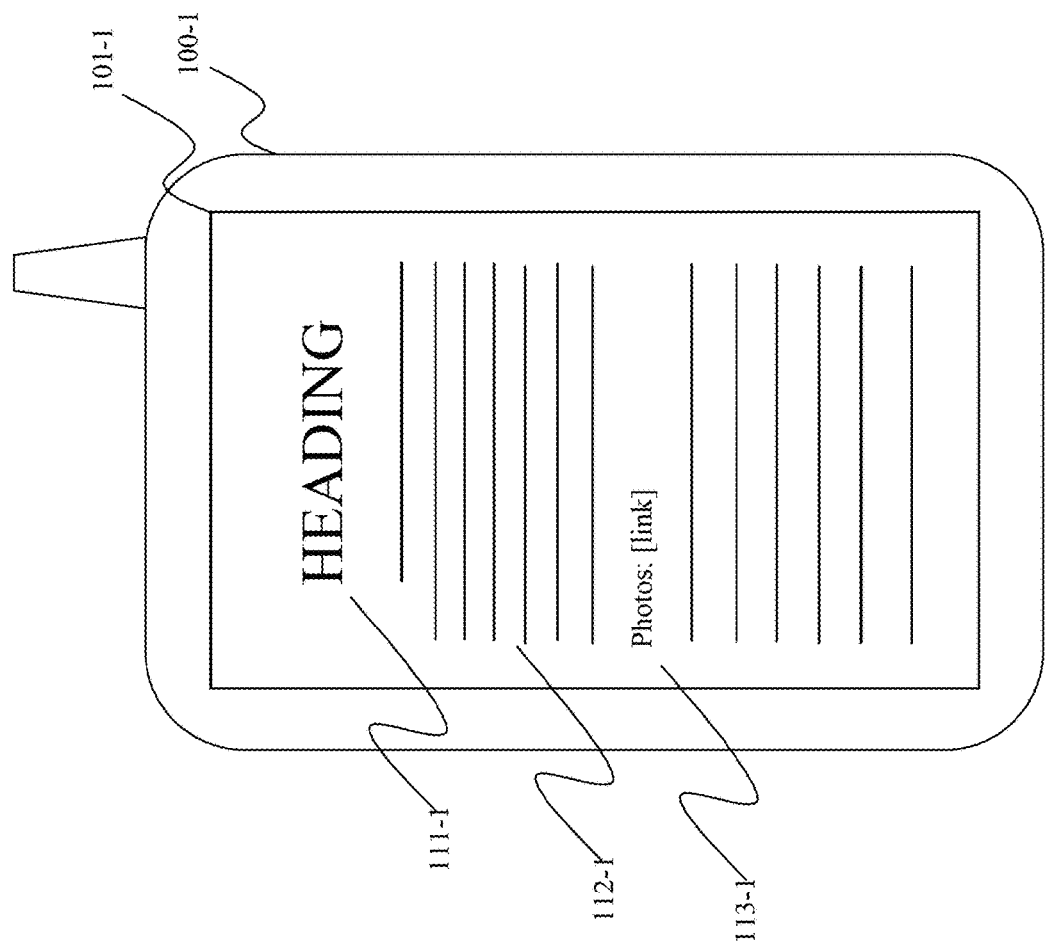
FIGS. 1(a)-1(b) illustrate examples of content displayed in various user platforms in accordance with the present teaching.

In FIG. 1(a), a typical presentation of content 101-1 intended for certain platforms such as a mobile platform may generally be of a minimal format. When viewed on such a platform, only the minimal amounts of content are typically displayed. For example, as shown in FIG. 1(a), an article 101-1 is presented on the display of platform 100-1 which may be a mobile device. This article contains a heading 111a, body text 112-1, and links 113a to photos relating to the article. As shown in FIG. 1(a), typically only text is displayed and the formatting of the heading 111-1 and body text 112-1 of the requested content is made to best fit on a small screen of a mobile platform. Moreover, photos or other media such as videos that might be relevant to the requested content are typically included as text-based links 113-1 and may not be resolved into images when the page is first loaded, but only after the user selects such link.

Such a minimalist view is often ideal for users of mobile platforms simply because there is not enough space on the display of a hand-held device to show much more than text. The convenience of accessing such mobile-specific content tends to come at the cost of the viewing experience to the user.

Figure 1B:

In FIG. 1(b), a presentation of content 110b is shown on a platform 101-2 in accordance with an embodiment of the present teaching. Platform 101-2 may be a graphic display of a larger size than a mobile device platform for which the requested content was intended. Such a platform 101-2 could be, for example, a monitor connected to a desktop computer, a home entertainment center, or even a tablet computer. In any of these examples, the display platform may be less-restrictive than the mobile platform for which the requested content was intended. As shown in FIG. 1(*b*) the requested content 110-2 is presented in the center region of the graphic display 101-2, with a heading 111-2, text 112-2, and photos 113-2. Although similar to the requested content on mobile platform in FIG. 1(*a*), the requested content in FIG. 1(*b*) may take advantage of, for example, the larger display size, faster processing speed, and greater bandwidth and may be enriched in terms of the font sizes of the heading 111-2 and article body 112-2 and the photographs 113-2 may be downloaded, rendered, and embedded into the article body 112-2.

In addition to the requested content presented 110-2, additional content is presented to the user of platform 101-2. For example, a region 102-2 located at the top of the content page may be used to present information to the user that is, for example, related to the user account. For example, the user may be accessing the requested content through the user's Yahoo! home page and the top portion of the display 102-2 may be the Yahoo! banner information, which provides to the user access to content through, for example, a search engine command line. In addition, region 121-2 located to the left of the requested content may, for example, present to the user access to content relating the user's personal accounts. For example, if a user links her accounts to an enriched content provider, region 121-2 may display links to and/or portions of the user's personal content such as email, documents, twitter, and content from other social media accounts that relate to the requested content. Further, to the right of the requested content 110-2, the region(s) 131-2, 132-2, and 133-2 may contain places where additional content is presented that is related to the requested content 110-2. One exemplary configuration is where in the top region 131-2, there are headings and links to content that is determined to be related to the requested content 110-2 such as, for example, news articles that are covering the same topic as the requested content. Also in this exemplary configuration, in region 132-2, there may be headings and links to comments made on one or more social media sites relating to the topic of the requested content. Finally, in the region 133-2 there may be one or more targeted advertisements that have some relevance to the requested content.

In addition, the additional content is specific to the user at that particular instant. As discussed further below, the identification of the additional content may be based on the content that the user initially requested, the user's location and other demographic information, the user's other accounts and social media connections, the user's selected preferences, and the user's interests based on past activities. Additional content associated with any and all of these items may be presented to the user as a part of an enriched content display and provide to the user quickly-accessible links to other related content.

Of course, FIG. 1(*b*) is exemplary only and there is no specific arrangement or size of the regions presenting the requested content or the additional content. In one embodiment, the user is given the ability to select the quantity, locations, content types, and sizes of the regions that are presented. As shown in FIG. 1(*b*) a user may be able to select and modify the parameters of each region to create a customized portal page. In an alternative embodiment, the service through which the user is requesting the content may determine how and where at least some the additional content is displayed with the requested content. For example, the content provider may choose to have certain regions designated to displaying one or more advertisements.

Figure 2:
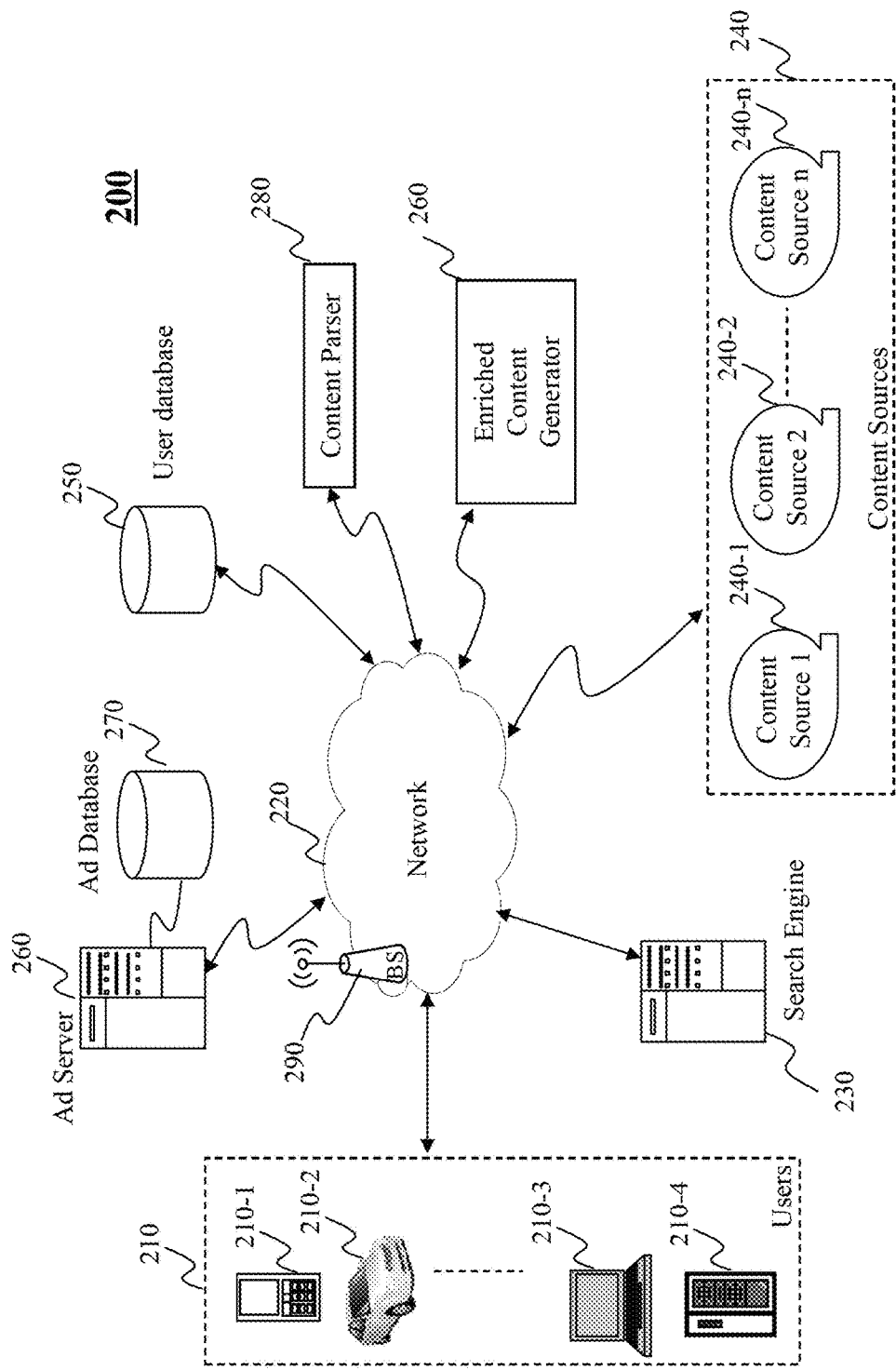
FIG. 2 is a high level depiction of an exemplary system in which additional content information is retrieved and integrated with requested content information, according to an embodiment of the present teaching.

FIG. 2 is a high level depiction of an exemplary system 200 in which an enriched content generator 260 is deployed to provide additional content, according to a first application embodiment of the present teaching. The exemplary system 200 includes users 210, a network 220, a search engine 230, content sources 240, user database 250, an ad server 260, an ad database 270, a content parser 280, and a base station 290. The network 220 in system 200 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as one or more base stations 290 or Internet exchange points through which a data source may connect to the network in order to transmit information via the network.

Users 210 may be of different types such as users connected to the network via desktop connections (210-4), users connecting to the network via wireless connections such as through a laptop (210-3), a handheld device (210-1), a wearable device such as glasses, goggles, or a helmet (not shown), or a built-in device in a motor vehicle (210-2). From a device 210, a user may send a request for content via the network 220 and receive the requested content through the network 220.

The target of the user's content query can vary. In one exemplary embodiment, the user sends a content query via network 220 to search engine 230. In one embodiment, the user accesses the search engine 230 by an interface such as a webpage presented on the user device 210 and connected to network 220. The search engine 230 may access content sources 240, among other sources, through the network 220 to locate and return a search result in response to the user's content query. The search engine may also access the enriched content generator 260 directly or through network 220 to provide additional content for presentation to the user in certain circumstances such as when the requested content is of a more restrictive, minimal format, e.g., a mobile-specific format and the user device 210 has, e.g., a larger display. The enriched content generator 260 may in turn seek additional content by searching for it through search engine 230, requesting it through ad server 260, or accessing it in user database 250 or contend sources 240. In another exemplary embodiment, the user sends the content query directly to the enriched content generator 260 via network 220. Similarly, the user may access the enriched content generator 260 directly by a user interface such as a web page presented on the user device 210. In such an embodiment, the user's content request to the content generator 260 may initiate one or more search queries with search engine 230 to locate the requested content as well as any additional content to integrate with the requested content to create an enriched content page to present to the user.

In either of the above-mentioned embodiments, content parser 280 may also be used as a part of a response for a request for content to parse content into content components for purposes of locating additional content, and/or integrating additional content with the requested content. Of course, depending on the system architecture, the content parser 280 may exist as a subcomponent of either or both the search engine 230 and enriched content generator 260 or be accessible over the network 220, as depicted in FIG. 2.

The content sources 240 include multiple content sources 240-1, 240-2, . . . . A content source may correspond to a web page host corresponding to an entity, whether an individual, a business, or an organization such as USPTO.gov, a content provider such as cnn.com and Yahoo.com, or a content feed source such as Twitter or blogs. Both the search engine 230 and the content generator 260 may access information from any of the content sources 240-1, 240-2, and rely on such information to respond to a query (e.g., the search engine 230 identifies content related to keywords in the query and returns the result to a user) or provide additional content relating to the requested content. The enriched content generator 260 may also access additional information, via the network 220, stored in the user database 250, which may contain, e.g. information about a user's preferences as well as content provided by ad server 260.

The information in the user database 250 may be generated by one or more different applications (not shown), which may be running on the search engine 230, at the backend of the search engine 230, or as a completely stand-alone system capable of connecting to the network 220, accessing information from different sources, analyzing the information, generating structured information, and storing such generated information in the user database 250. Such information can be state information such as cookies, or structured information, giving weight to certain categories of content that the user or other similar users tend to find of interest. One example of this is the generation of a user's preferences based on the user's past activities. When a user is presented with requested content and the additional content, observations of the user's course of actions with respect to the additional content may be used to better-tailor selections and presentation of subsequent additional content. This feedback enables the system, for example, to learn the interests of the user.

The user database 250 may contain information relating to a population of users. The enhanced content generator, for example, or a separate engine or agent (not shown), may access this information to find similarities among users in order to locate content in response to a request for content. For example, when User A seeks information relating to, say, movies playing in local theatres and subsequently access content relating to reviews on movies currently in theatres, then when User B access content relating to movies playing in local theatres the enriched content generator or other object would attribute some weight to content relating to movie reviews when ranking the additional content presented to User B. Moreover, when 100 users request content relating to, for example, local movies playing and 90 of the 100 subsequently access content relating to the latest James Bond movie, then enriched content generator or other object would attribute weight to content relating to the latest James Bond movie when ranking the additional content presented to a user requesting content relating to local movies plating. In addition, each request for content that a user executes may be compared to other users to create loose groups or clusters of similar users and the enriched content generator may take into account the interests of other users in a group or cluster when determining what items to include as additional content and how to rank such content.

Figure 3:
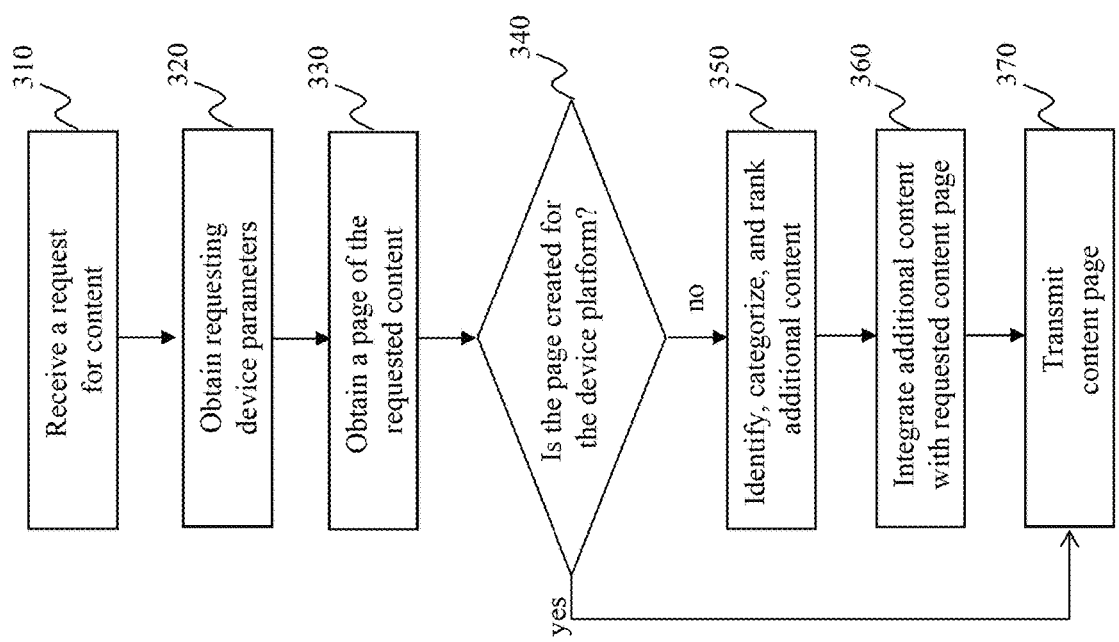
FIG. 3 is a flowchart of an exemplary process in which a content enrichment server is operated to provide enriched content, according to an embodiment of the present teaching.

FIG. 3 is a flowchart of an exemplary process in which a content enrichment server operates to provide enriched content, according to an embodiment of the present teaching. In this embodiment, a request for content is received in step 310. This request may be directed to and/or serviced by a search engine, an enriched content generator, or even a separate server specifically configured to handle such requests. In any case, such a device may operate an interface with which a user may interact including entering a request for content. The request may be a general request for content such as the latest new headlines on CNN.com or a specific request for content such as a specific news article or a particular URL. In response to the request for content step 310, the device parameters are obtained in step 320. Such device parameters may include the display settings, the browser window size, and the availability of certain browser plug-ins. A page of the requested content is obtained in step 330. To obtain the requested content page, the content enrichment server locates the content by its own mechanisms or by employing a search engine, the selection of which may depend upon whether the requested content is locally accessible or whether the content is available remotely through the internet. When the page is obtained, step 340 determines whether the page was created for a specific platform. In order to make this determination, additional sub-steps may include scanning and/or rendering the requested content page for any indicators that it is, for example, mobile specific. If it is determined that the requested content is not created for the requesting device platform (e.g., a desktop computer requesting content that was created specifically for a mobile platform), then, in step 350, additional content is identified. The identification of additional content, as described in more detail in the description of FIG. 4, may depend on any number of factors, including but not limited to the subject matter of the requested content or the user's preferences, as may be determined by the user's affirmative selections, search history, social medial connections, or preferences of other users that are deemed related to the user in one or more ways (social media connection (e.g., a follower on Twitter), a contact, or just another user that has similar interests). From any of these sources, additional content may be identified and categorized in one or more categories (e.g., news article, advertisement, tweet, etc.).

In step 350 the identified content is also ranked in an order that is most relevant to the user. However, in the case of advertisements or other revenue-generating content, the ranking may be weighted on the basis of revenue, i.e., the income generated when the user clicks on the advertisement or other content. The amount of additional content identified bay be determined by the additional space available on the browser or display of the requesting user's device. For example, if the requested content would take up only 50% of the useable space and each additional content is allocated 10% of the space, then five items of additional content may be identified. Next, in step 360, the additional content is integrated with the requested content page. This integration may be performed in a number of ways, such as by including links to the additional content in a separate area along side of the requested content. Another format may be that the additional content is embedded within the requested content, such as making certain words in the requested content into hyperlinks to the additional content or, for example, placing small advertisements in line with the text of the requested content and predetermined intervals (such as every ten lines of text). The end result is that an enriched page is generated containing the requested content and additional content. Finally, in step 370, the page is transmitted to the user in response to the request. Step 370 is also the action that is taken when it is determined, in step 340, that the requested content is created for the device platform requesting the content. Alternatively, or in addition, at step 340, the requested content page may be parsed into its components whether or not it was intended for the platform of the requesting user. This enables the process to retain the relevant portions of the request for content and continue through the process of obtaining additional content.

Figure 4:
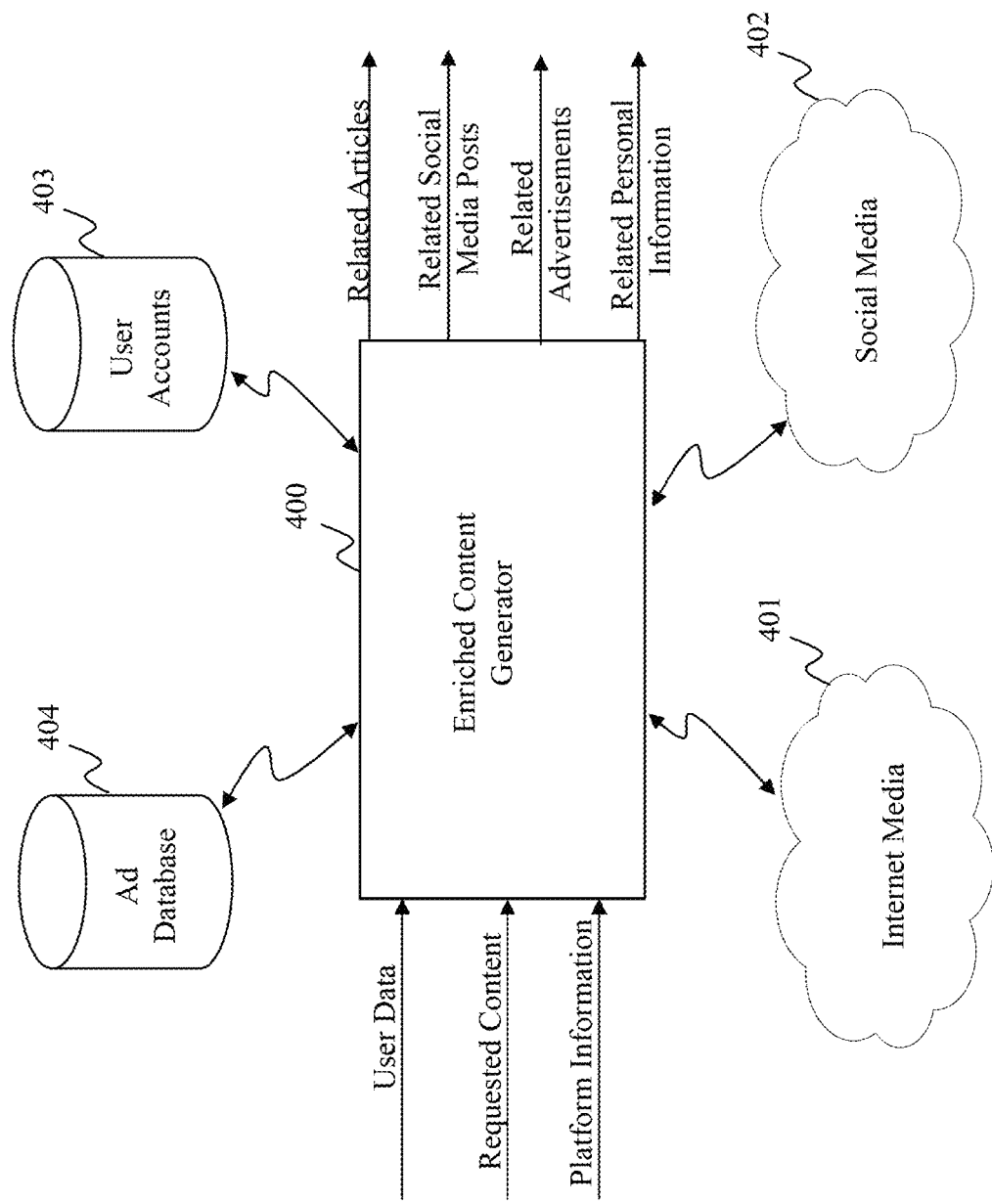
FIG. 4 depicts an enriched content generator with inputs and outputs, according to an embodiment of the present teaching.

FIG. 4 depicts the inputs and outputs of an enriched content generator 400, according to an embodiment of the present teaching. When it is determined that additional content is to be presented, the enriched content generator receives information relating to the requested content (such as the request for content or parsed data from the requested content), the data from a user (such as user account information like subscriptions and memberships), and platform information (such as browser size). In analyzing the input content/information, the content generator 400 draws from media sources available from the Internet 401, social medial sites 402, user account data 403 associated with the requesting user as well as other users, and advertisement databases to identify related material to the requested content and the user's preferences and supply the related material as an output.

To illustrate this process, take the example of a user request for content relating to skiing in Aspen, Colo. When the system receives such a request for content, it may follow the process outlined in FIG. 3. When it is determined that additional content may be presented, the enriched content generator 400 may review all or part of (parsed) the requested content and the user data to determine where to retrieve the additional content. Based on this information, the enriched content generator may identify related articles on the Internet 401 that are related to the requested content such as ski resorts in Aspen (e.g., web pages to ski resorts, weather reports, etc.). However, because the enriched content generator may also access social media content relating to the user 402, the enriched content generator may be able to identify (and attribute a higher ranking weight to) ski resorts in Aspen that were also visited by social connections of the user. For example, perhaps a social connection of the user visited Aspen last season and "checked in" to Snowmass Ski Resort and posted photographs of the trip. Each of these related social media items may potentially be used as additional content to present to the user. Other related content might be identified by reviewing other user accounts 403 who also searched for skiing in Aspen, Colo. Moreover, a related advertisement may be generated from ad database 404 for inclusion as additional content having some relationship to the user's social media connections (e.g., the particular hotel that the user's social media connection stayed at when visiting Aspen, or the type of powder skis the connection purchased last season). Finally, the additional content may be the user's personal information, such as information relating to the user's itinerary for her upcoming ski trip to Aspen.

Figure 5:
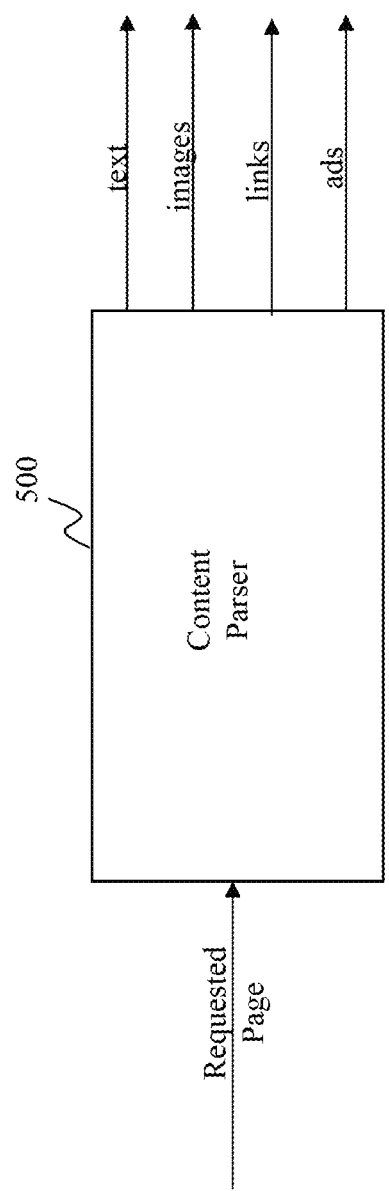
FIG. 5 depicts a parsing engine with an input and outputs, according to an embodiment of the present teaching.

FIG. 5 depicts the input and outputs of the parsing engine 500, according to an embodiment of the present teaching. When requested to parse a requested page, the parsing engine takes the content of the identified page and separates each component of the content into a separate item. As mentioned before, parsing engine may be a separate agent or may be an integrated function of a search engine or enriched content generator. As shown in FIG. 5, the parsing engine retrieves or receives a requested page and outputs the various components of the requested page, such as the text, images, links, and even ads. The parsing engine may serve to parse content for at least two purposes: 1) to parse the requested content into components for identifying related content, and 2) to parse content into components for integrating and presenting enriched content to the user.

Figure 6:
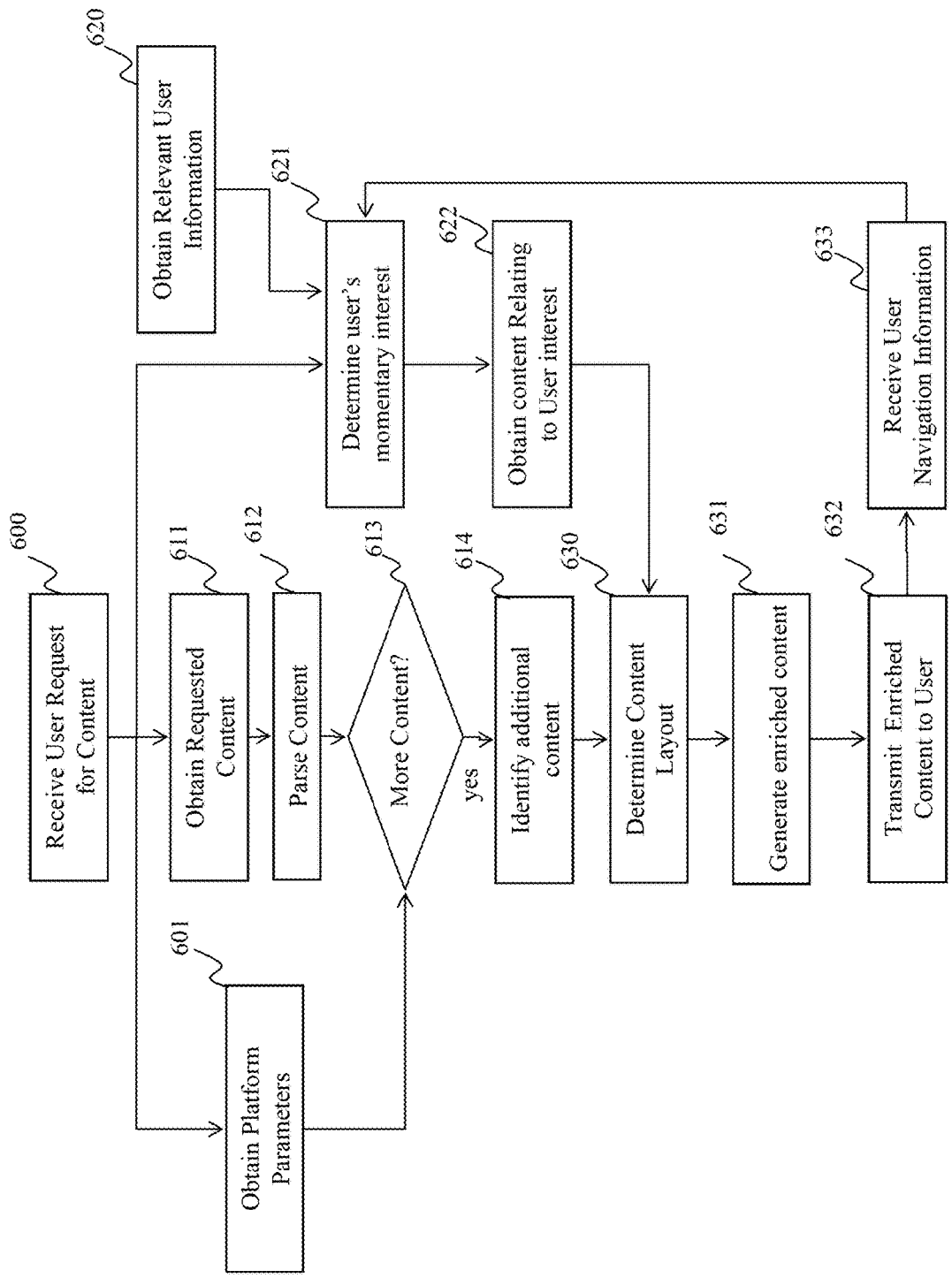
FIG. 6 is a flowchart of an exemplary process in which a content enrichment server operates tasks in parallel to provide enriched, content, according to an embodiment of the present teaching.

FIG. 6 is a flowchart of an exemplary process in which a content enrichment server may operate tasks in parallel to provide enriched content, according to an embodiment of the present teaching. In this process, a request for content may be received from the user, at 600. The system may, in parallel, obtain platform parameters, at 601, retrieve requested content, at 611, and determine the user's momentary interests, at 621. The system may parse the requested content into its components, at 612. The parsing may provide information relating to whether the requested content was intended for a particular platform, such as, e.g., a mobile platform. The obtained platform parameters and requested content information may be compared and it may determine whether additional content is to be requested, in step 613. If so, the process may identify additional content, at 614. Additional content relating to the user's interests may also be obtained, at 622. When the system has obtained the platform parameters, additional content relating to the requested content, and additional content relating to the user's momentary interests, the layout of the content may be determined, at 630. The layout determination may take into account the platform parameters (i.e., the available area to present content) and the relevance of each additional content with respect to factors of relevance discussed previously. The enriched content may then be generated, at 631, and transmitted to the user, at 632. In addition, the system may learn of the user's preferences and customize its subsequent enriched content by following the user's subsequent navigation information, at 633. This navigation information may be collected and subsequently used to determine the user's momentary interest, at 621.

Figure 7:
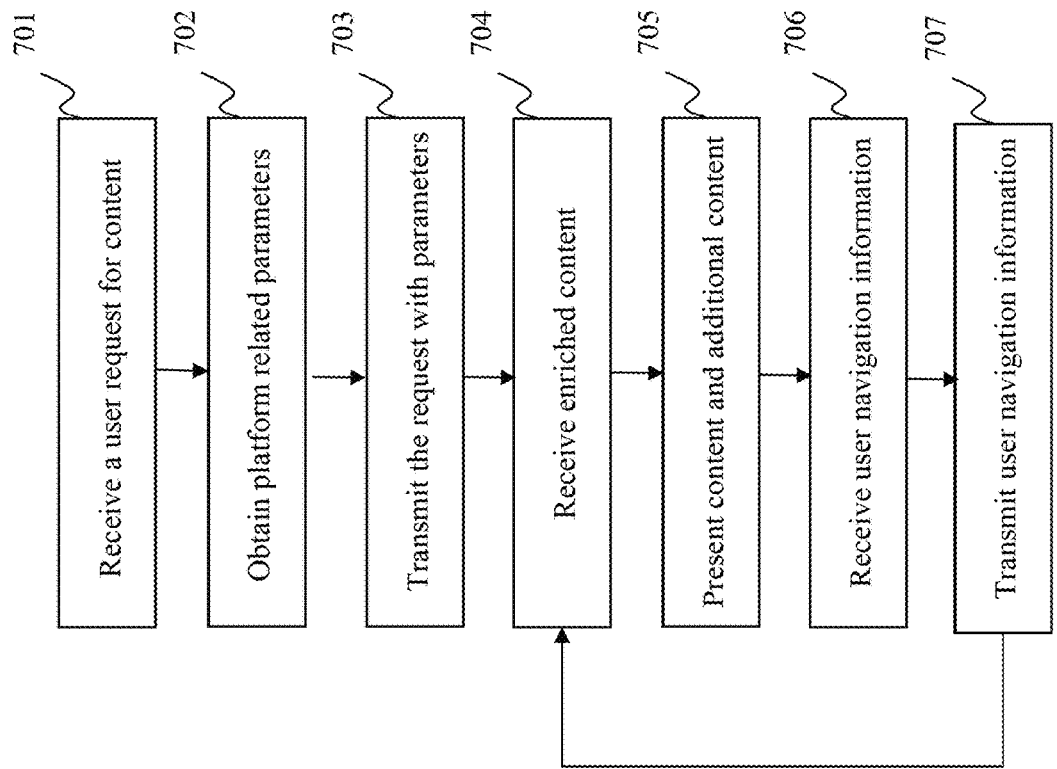
FIG. 7 is a flowchart of an exemplary process in which a client requesting content receives enriched content, according to an embodiment of the present teaching.

FIG. 7 is a flowchart of an exemplary process in which a client requesting content receives enriched content, according to an embodiment of the present teaching. In this process, a content request is received from a user of the client, at 701. The parameters relating to the user platform are obtained, at 702, and then transmitted with the request to the server, at 703. Subsequently, the enriched content is received by the client from the server, at 704. As discussed above, the enriched content contains both the requested content as well as additional content relating to the requested content and the user. The received content (requested and additional) is then presented to the user, at 705. As the user navigates the requested content and additional content, the client receives this information, at 706, and transmits it to the server, at 707, so that the server may incorporate the user's navigation information in subsequent determinations of additional content.

Figure 8:
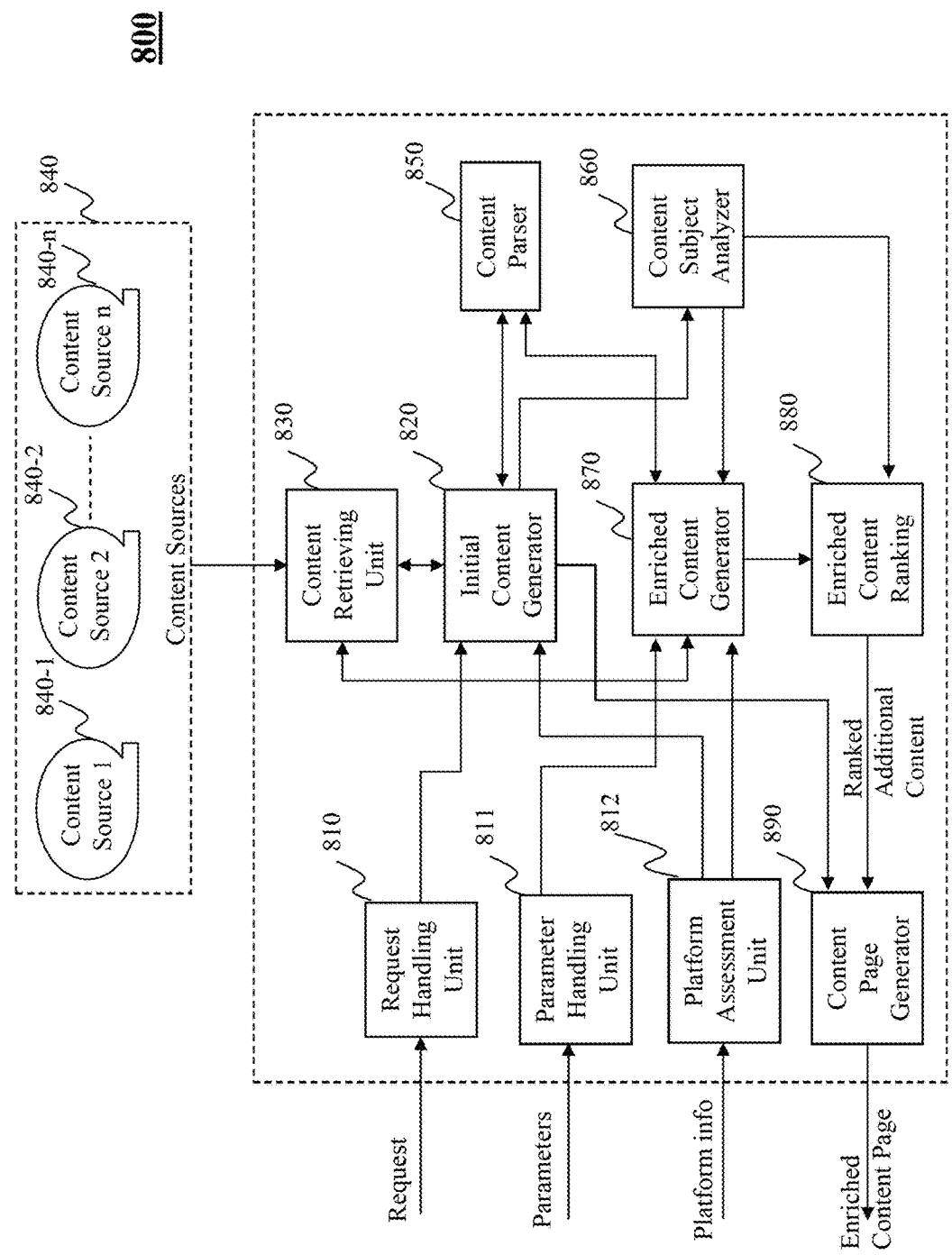
FIG. 8 is a functional block diagram of a system embodiment of the present teaching.

FIG. 8 is a functional block diagram of an exemplary system 800 in which the a request for content may return an enriched content page. Each or some of the blocks in system 800 may be a stand-alone computer or server connected to the Internet and/or a local area network while others may be subroutines within one or more programs operating on a single computer or server. In this system, a request handling unit 810 may initially receive a request for content. Depending on certain conditions, such as for example, system demands, time of day, geographic location of requestor, preferences selected by the requestor, or type of request, the request handling unit 810 may for example deny the request, redirect the request, or queue the request.

Under some conditions, the request handling unit may send a request to the initial content generator 820 for generating initial content. Depending on the manner of the request and the parameters, if any, set by the requesting user, the initial content generator 820 may do any number of things in response to the request. For example, in response to certain requests received by the initial content generator 820 from the request handling unit 810, the initial content generator 820 may send a request for content to the content retrieving unit 830. This request sent to the content retrieving unit 830 may be identical to the incoming request for content that was received by the request handling unit 810. Upon receiving the request for content, the content retrieving unit 830 may retrieve the content from one or more content sources 840 or, in some embodiments, the content retrieving 830 unit may cache some content that, for example, may be commonly requested. The retrieved content may contain information relating to the type of platform upon which the page was intended to be viewed (e.g., a mobile device). Upon retrieving the requested content, the content retrieving unit 830 may then forward the retrieved content to the initial content generator 820.

Upon receiving the requested content, the initial content generator may do a number of things sequentially or simultaneously. The initial content generator 820 may send the requested content to the content parser 850 to parse the requested content into different components such as text, images, headings, advertisements, etc. The content parser 850 may be able to parse the requested content based on typical HTML organization but also based on heuristics or other known methods. The content parser 850 may then return some or all of the content to the initial content generator 820 where it may be forwarded to the content page generator 890. The content parser 850 may also forward or indicate to the enriched content generator 870 certain information such as the type of information was requested by the request for content.

The initial content generator 820 may also forward some or all of the requested content it received from the content retrieving unit 830. What may be forwarded to the content page generator 890 from the initial content generator 820 may be dependent upon the information provided by the platform assessment unit 812. For example, the platform assessment unit 812 may indicate to the initial content generator 820 that platform of the device upon which the request was sent may be a desktop computer with a browser window open at a size of 1680×1050 pixels while the content retrieving unit 830 sent to the initial content generator 820 content that was designed for a mobile device having a browser window of 960×640. In such circumstance, the initial content generator 820 may send the parsed text of a requested content to the content page generator 890 as well as embedded photos or videos in a larger size (area and/or resolution).

The initial content generator 820 may also forward or indicate to content subject analyzer 860 the requested content it received from the content retrieving unit 830. The content subject analyzer 860 analyzes the requested content for a multitude of things such as for example the type of content (e.g., news, information, photo, audio, video, etc.), the subject matter of the content, the temporal significance of the content (i.e., a historical request or a recent news event). The content analyzer 860 may then send certain search terms and other information to the enriched content generator 870 for determining what type of and how to prioritize additional content to include into the enriched content page.

Upon receiving information from the content subject analyzer 860, the enriched content generator 870 may send a request to the content retrieving unit 830 to retrieve enriched content. Upon receiving the requested content from the content retrieving unit 830, the enriched content generator 870 may forward the content to the enriched content ranking module 880 where the enriched content is ranked according to its relevance to the terms identified by the content subject analyzer 860. In some embodiments, the enriched content may also be sent to the content parser 850 to be parsed and returned to the enriched content generator 870 in various parts. Upon receiving and ranking the enriched content, the enriched content ranking module 880 sends the ranked additional content to the content page generator 890. Upon receiving the requested content from the initial content generator 820 and the ranked additional content from the enriched content ranking module 880, the content page generator 890 combines the contents into one page to be viewed by the requesting user.

To implement the present teaching, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
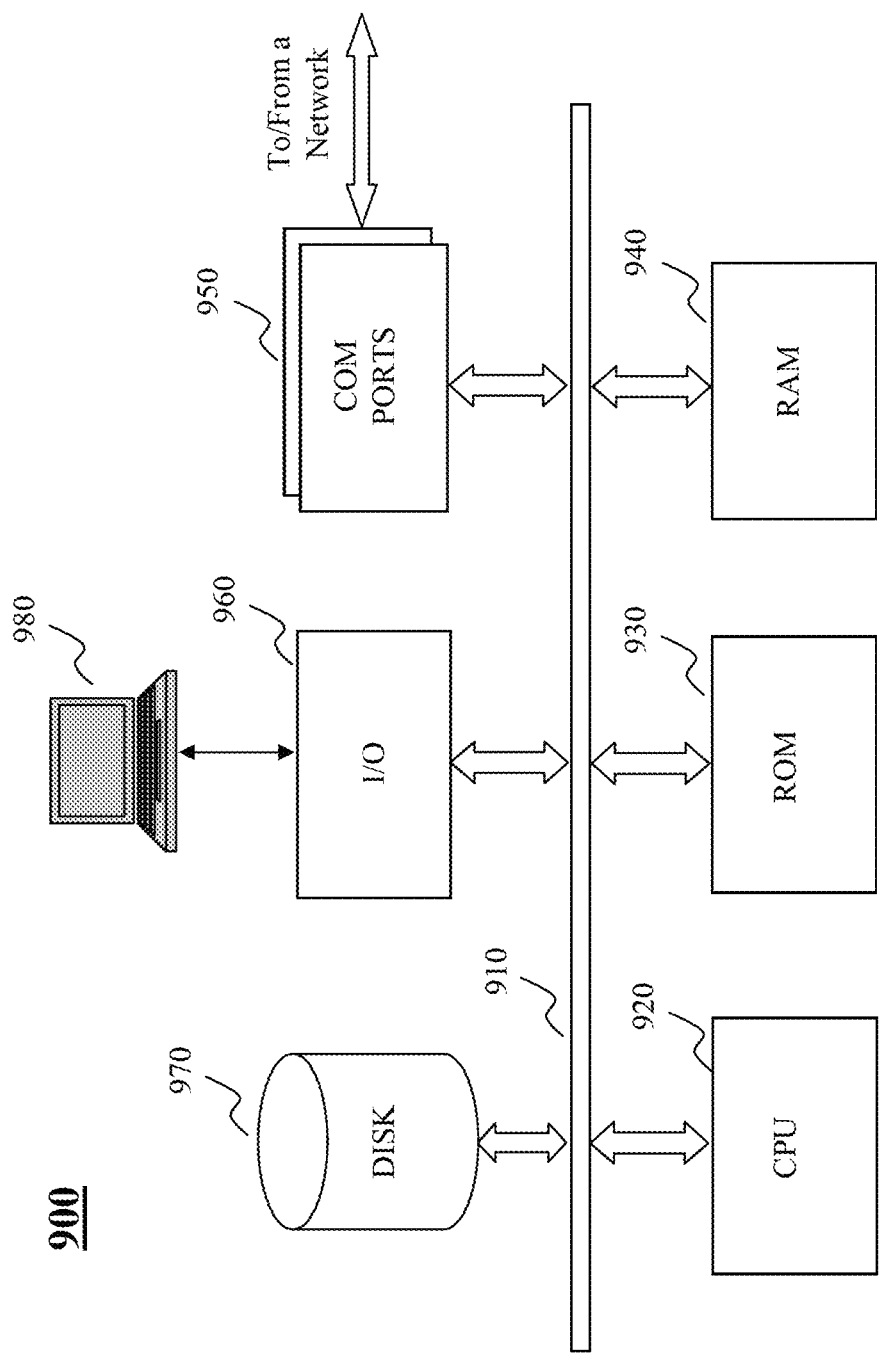
FIG. 9 depicts a general computer architecture on which the present teaching can be implemented.

FIG. 9 depicts a general computer architecture on which the present teaching can be implemented and has a functional block diagram illustration of a computer hardware platform which includes user interface elements. The computer may be a general purpose computer or a special purpose computer. This computer 900 can be used to implement any components of the enriched content generation as described herein. For example, the enriched content generator processing unit 400 of FIG. 4 that process an inquiry about how additional content is related to requested contend and user information can be implemented on a computer such as computer 900, via its hardware, software program, firmware, or a combination thereof. Although only one such computer is shown, for convenience, the computer functions relating to content enrichment may be implemented in a distributed fashion on a number of similar platforms, to distribute the processing load.

The computer 900, for example, includes COM ports 950 connected to and from a network connected thereto to facilitate data communications. The computer 900 also includes a central processing unit (CPU) 920, in the form of one or more processors, for executing program instructions. The exemplary computer platform includes an internal communication bus 910, program storage and data storage of different forms, e.g., disk 970, read only memory (ROM) 930, or random access memory (RAM) 940, for various data files to be processed and/or communicated by the computer, as well as possibly program instructions to be executed by the CPU. The computer 900 also includes an I/O component 960, supporting input/output flows between the computer and other components therein such as user interface elements 980. The computer 900 may also receive programming and data via network communications.

Figure 10:
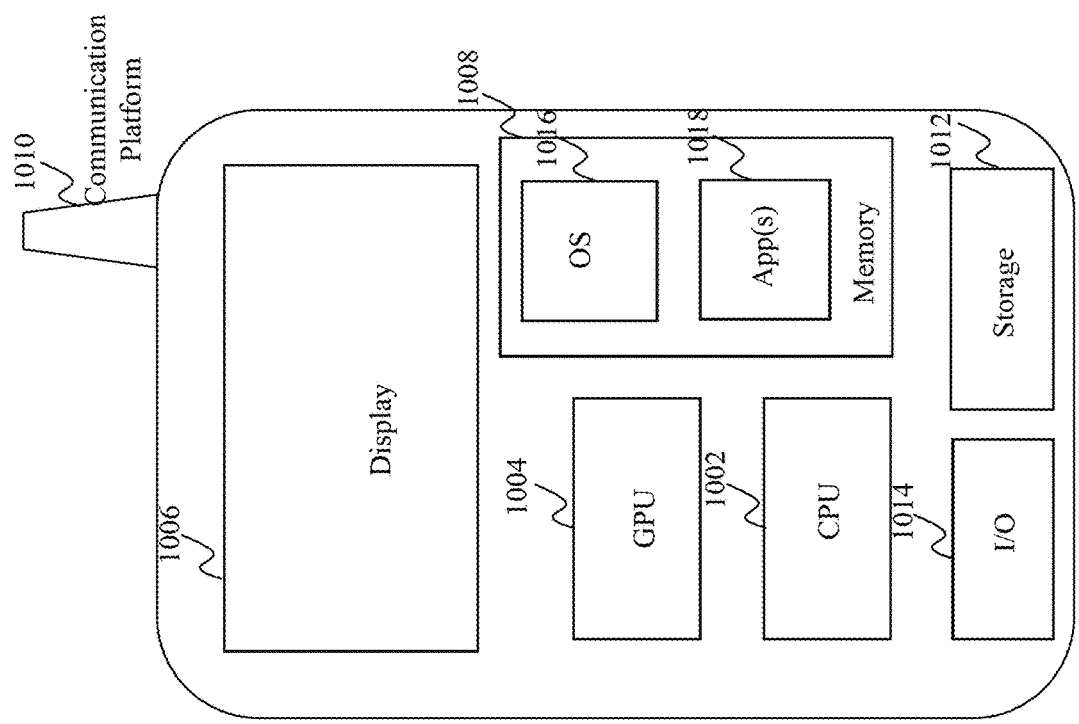
FIG. 10 depicts a general mobile device architecture on which the present teaching can be implemented.

FIG. 10 depicts a general mobile device architecture on which the present teaching can be implemented. In this example, the user device on which enriched content is presented is a mobile device 1000, including but is not limited to, a smart phone, a tablet, a music player, a handled gaming console, a global positioning system (GPS) receiver. The mobile device 1000 in this example includes one or more central processing units (CPUs) 1002, one or more graphic processing units (GPUs) 1004, a display 1006, a memory 1008, a communication platform 1010, such as a wireless communication module, storage 1012, and one or more input/output (I/O) devices 1014. Any other suitable component, such as but not limited to a system bus or a controller (not shown), may also be included in the mobile device 1000. As shown in FIG. 10, a mobile operating system 1016, e.g., iOS, Android, Windows Phone, etc., and one or more applications 1018 may be loaded into the memory 1008 from the storage 1012 in order to be executed by the CPU 1002. The applications 1018 may include a browser or any other suitable mobile apps for receiving and rendering enriched content stream on the mobile device 1000. Execution of the applications 1018 may cause the mobile device 1000 to perform the processing as described above. For example, the display of enriched content to the user may be made by the GPU 1004 in conjunction with the display 1006. User interactions with the enriched content may be achieved via the I/O devices 1014 and provided to the enriched content generator via the communication platform 1010.

Hence, aspects of the methods of providing enriched content to a user platform based on the requested content and the user platform, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof such as various semiconductor memories, tape drives, disk drives and the like, which, may provide storage at any time for the software programming.

All or portions of the software may at times be communicated through a network such as the Internet or various other telecommunication networks. Such communications, for example, may enable loading of the software from one computer or processor into another, for example, from a user device into the hardware platform(s) of a computing environment or other system implementing a computing environment or similar functionalities in connection with providing enriched content to a user platform based on the requested content and the user platform. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the system and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one machine, each of which has at least one processor, storage, and a communication platform connected to a network for providing content, the method comprising:
    receiving a request for content from a user, wherein the content is to be presented on a first platform;
    obtaining one or more parameters associated with presenting the content using the first platform;
    obtaining a page of the content;
    analyzing the page to generate a first set of components of the page;
    determining whether the page is created with respect to a second platform having a second set of parameters that is more restrictive than the one or more parameters, wherein the second set of parameters is associated with presenting the content using the second platform;
    generating, in response to determining that the page is created with respect to the second platform and that a version of the page created with respect to the first platform is unavailable, first additional content having components related to the first set based, at least in part, on the one or more parameters;
    integrating the first additional content with the page to generate an enriched content page for the first platform; and
    transmitting the enriched content page to the user as a response to the request.

2. The method of claim 1, wherein the first additional content is generated based, at least in part, on information associated with the user.

3. The method of claim 1, wherein the one or more parameters include a user profile.

4. The method of claim 1, further comprising:
identifying second additional content having a subject matter related to the content, wherein the second additional content is further integrated with the page to generate the enriched content page.

5. The method of claim 1, wherein:
the request includes first information associated with the first platform related to a device of the user; and
the page is delivered with second information associated with the second platform.

6. The method of claim 1, further comprising:
ranking each piece of the first additional content based on a degree of relatedness to the content, wherein:
each piece of the first additional content is presented in the enriched content page in a layout based, at least in part, on its rank.

7. The method of claim 1, wherein the first platform comprises a non-mobile device platform and the second platform comprises a mobile device platform.

8. A method implemented on at least one machine, each of which has at least one processor, storage, and a communication platform connected to a network for presenting content, the method comprising:
transmitting a request for content from a user;
transmitting one or more parameters associated with a first platform on which the content is to be presented;
receiving an enriched content page of the content, the enriched content page having a second portion integrated with a first portion, wherein:
the first portion of the page is created with respect to a second platform having a set of parameters, which is more restrictive than the one or more parameters, and analyzed to generate a set of components of the first portion, the set of parameters being associated with presenting the content using the second platform; and
the second portion of the page is created to have components related to the set of components based, at least in part, on the one or more parameters such that additional content having the components is generated in response to determining that the page is created with respect to the second platform and that a version of the page created with respect to the first platform is unavailable, and to generate an enriched content page, when the page of the content is to be presented with respect to the second platform; and
presenting the enriched content page on the first platform.

9. A method implemented on at least one machine, each of which has at least one processor, storage, and a communication platform connected to a network for providing content, the method comprising:
receiving a request for content to be presented on a first platform;
retrieving the content;
analyzing the content to generate a first set of components of the content;
determining whether the content is created with respect to a second platform having a second set of parameters that is more restrictive than one or more parameters associated with presenting the content using the first platform, wherein the second set of parameters is associated with presenting the content using the second platform;
identifying additional content having components related to the first set based, at least in part, on the one or more parameters, wherein the additional content is generated in response to determining that the content is created with respect to the second platform and that a version of the page created with respect to the first platform is unavailable;
integrating the additional content with the content to generate an enriched content page for the first platform; and
transmitting the enriched content page as a response to the request.

10. A method implemented on at least one machine, each of which has at least one processor, storage, and a communication platform connected to a network for providing content, the method comprising:
receiving a request for content from a user, wherein the content is to be presented on a first platform;
obtaining one or more parameters associated with presenting the content using the first platform;
retrieving a page of the content;
determining whether the page is created with respect to a second platform having a first set of parameters that is more restrictive than the one or more parameters, wherein the second set of parameters is associated with presenting the content using the second platform;
analyzing the page to generate a second set of components of the page;
retrieving, in response to determining that page is created with respect to the second platform and that a version of the page created with respected to the first platform is unavailable, additional content having components related to at least one component in the second set of components based, at least in part, on the one or more parameters;
integrating the additional content with the at least one component to generate an enriched content page for the first platform; and
transmitting the enriched content page to the user as a response to the request.

11. A system having at least one processor, storage, and a communication platform connected to a network for providing an enriched content page, comprising:
a request handling unit configured for receiving a request for content from a user, wherein the content is to be presented on a first platform;
a parameter handing unit configured for obtaining one or more parameters associated with presenting the content using first platform;
a content retrieving unit configured for obtaining a page of the content;
a content parser configured for analyzing the page to generate a first set of components of the page;
a platform assessment unit configured for determining whether the page is created with respect to a second platform having a second set of parameters that is more restrictive than the one or more parameters, wherein the second set of parameters is associated with presenting the content using the second platform;
an enriched content generator configured for generating, in response to determining that the page is created with respect to the second platform and that a version of the page created with respect to the first platform is unavailable, first additional content having components related to the first set based, at least in part, on the one or more parameters; and a content page generator configured for integrating the first additional content with the page to generate an enriched content page for the first platform and transmitting the enriched content page to the user as a response to the request.

12. The system of claim 11, wherein the first additional content is generated based, at least in part, on information associated with the user.

13. The system of claim 11, wherein the one or more parameters include a user profile.

14. The system of claim 11, further comprising:
a content subject analyzer configured for identifying second additional content having a subject matter related to the content, wherein the content page generator is further configured for integrating the second additional content with the page to generate the enriched content page.

15. The system of claim 11, wherein:
the request includes first information associated with the first platform related to a device of the user; and
the page is delivered with second information associated with the second platform.

16. The system of claim 11, further comprising:
an enriched content ranking module configured for ranking the first additional content based on its relatedness to the requested content.

17. The system of claim 11, further comprising:
a content parser configured for parsing the content into one or more parts.

18. The system of claim 11, wherein the first platform comprises a non-mobile device platform and the second platform comprises a mobile device platform.

19. A machine-readable tangible and non-transitory medium having information recorded thereon for providing enriched content, wherein the information, when read by the machine, causes the machine to perform the following:
receiving a request for content from a user, wherein the content is to be presented on a first platform;
obtaining one or more parameters associated with the presenting the content using the first platform;
obtaining a page of the content;
analyzing the page to generate a first set of components of the page;
determining whether the page is created with respect to a second platform having a second set of parameters that is more restrictive than the one or more parameters, wherein the second set of parameters is associated with presenting the content using the second platform;
generating, in response to determining the page is created with respect to the second platform and that a version of the page created with respect to the first platform is unavailable, first additional content having components related to the first set based, at least in part, on the one or more parameters;
integrating the first additional content with the page to generate an enriched content page for the first platform; and
transmitting the enriched content page to the user as a response to the request.

20. The medium of claim 19, wherein the first additional content is generated based, at least in part, on information associated with the user.

21. The medium of claim 19, wherein the one or more parameters include a user profile.

22. The medium of claim 19, wherein:
the request includes first information associated with the first platform related to a device of the user; and
the page is delivered with second information associated with the second platform.

23. The medium of claim 19, further comprising:
identifying second additional content having a subject matter related to the content, wherein the second additional content is further integrated with the page to generate the enriched content page.

24. The medium of claim 19, further comprising:
ranking each piece of the first additional content based on a degree of relatedness to the content, wherein:
each piece of the first additional content is presented in the enriched content page in a layout based, at least in part, on its rank.

25. The medium of claim 19, wherein the first platform comprises a non-mobile device platform and the second platform comprises a mobile device platform.

* * * * *